United States Patent
Chang et al.

(10) Patent No.: US 9,075,626 B2
(45) Date of Patent: Jul. 7, 2015

(54) COMPUTING DEVICE AND PRODUCT REPORT METHOD

(71) Applicants: Chih-Kuang Chang, New Taipei (TW); Xin-Yuan Wu, Shenzhen (CN); Wei Wang, Shenzhen (CN)

(72) Inventors: Chih-Kuang Chang, New Taipei (TW); Xin-Yuan Wu, Shenzhen (CN); Wei Wang, Shenzhen (CN)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 258 days.

(21) Appl. No.: 13/659,955

(22) Filed: Oct. 25, 2012

(65) Prior Publication Data

US 2013/0135355 A1 May 30, 2013

(30) Foreign Application Priority Data

Nov. 28, 2011 (CN) .......................... 2011 1 0383852

(51) Int. Cl.
*G09G 5/00* (2006.01)
*G09G 5/02* (2006.01)
*G06F 9/44* (2006.01)
*G06T 11/60* (2006.01)
*G06F 3/14* (2006.01)

(52) U.S. Cl.
CPC . *G06F 9/44* (2013.01); *G06T 11/60* (2013.01); *G06F 3/14* (2013.01); *G06F 8/30* (2013.01)

(58) Field of Classification Search
None
See application file for complete search history.

(56) References Cited

U.S. PATENT DOCUMENTS

| | | | | |
|---|---|---|---|---|
| 7,656,543 | B2 * | 2/2010 | Atkins | 358/1.13 |
| 7,719,548 | B2 * | 5/2010 | Ubillos et al. | 345/684 |
| 7,760,956 | B2 * | 7/2010 | Lin et al. | 382/254 |
| 7,990,394 | B2 * | 8/2011 | Vincent et al. | 345/629 |
| 8,195,383 | B2 * | 6/2012 | Wipplinger et al. | 701/409 |
| 8,234,066 | B2 * | 7/2012 | Wipplinger et al. | 701/457 |
| 8,400,469 | B2 * | 3/2013 | Kuwabara et al. | 345/629 |
| 8,532,675 | B1 * | 9/2013 | Pasquero et al. | 455/456.3 |
| 8,564,623 | B2 * | 10/2013 | Cohen et al. | 345/634 |
| 8,645,056 | B2 * | 2/2014 | Wipplinger et al. | 701/408 |
| 2013/0106893 | A1 * | 5/2013 | Davis et al. | 345/589 |

* cited by examiner

*Primary Examiner* — Ryan R Yang
(74) *Attorney, Agent, or Firm* — Novak Druce Connolly Bove + Quigg LLP (57) ABSTRACT

A method for programming a measuring program into a computing device. The computing device selects a partial drawing from a panoramic drawing of a product using a frame, and marks the frame in the panoramic drawing. The computing device sets a pattern of a report and shows the partial drawing and the panoramic drawing in the report. The computing device adjusts a size of the panoramic drawing and the size of the panoramic drawing in the report until the panoramic drawing does not superpose on the partial drawing in the report. The computing device generate a measuring program which is capable of executing the procedure mentioned above.

12 Claims, 8 Drawing Sheets

A partial drawing
selected by the frame

COMPUTING DEVICE AND PRODUCT REPORT METHOD

BACKGROUND

1. Technical Field

Embodiments of the present disclosure generally relate to measurement technology, and more particularly to a product report method using a computing device.

2. Description of Related Art

When a drawing of a product (e.g., a shell of a mobile phone) is generated, the designer needs to check all details of the drawing. Sometimes, the details in the drawing may be incorrect. For example, a part of the drawing is supposed to be designed as a rounded corner, but the part of the drawing is actually designed as a square corner by mistake. Therefore, the designer needs to check if the drawing is correct. However, at present, the designer manually checks the drawing, which is very time-consuming, especially when the drawing is huge and complicated. Therefore, there is room for improvement in the art.

DETAILED DESCRIPTION

The disclosure, including the accompanying drawings, is illustrated by way of example and not by way of limitation. It should be noted that references to "an" or "one" embodiment in this disclosure are not necessarily to the same embodiment, and such references mean at least one.

In general, the word "module," as used herein, refers to logic embodied in hardware or firmware, or to a collection of software instructions, written in a programming language. One or more software instructions in the modules may be embedded in firmware, such as in an EPROM. The modules described herein may be implemented as either software and/or hardware modules and may be stored in any type of non-transitory computer-readable medium or other storage device. Some non-limiting examples of non-transitory computer-readable media include CDs, DVDs, BLU-RAY, flash memory, and hard disk drives.

Figure 1:
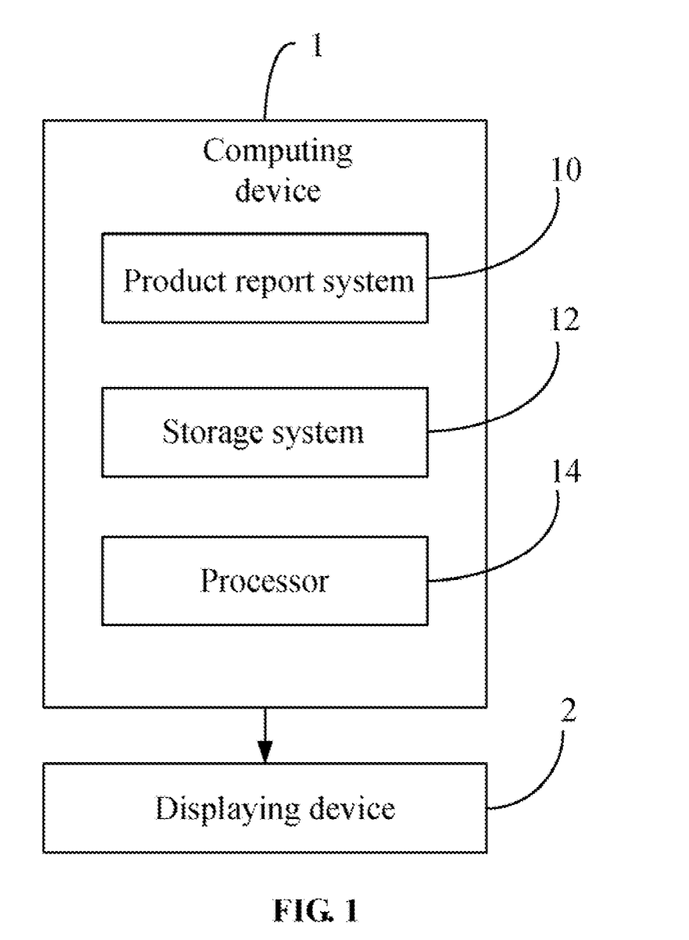
FIG. 1 is a block diagram of one embodiment of a computing device including a product report system.

FIG. 1 is a block diagram of one embodiment of a computing device 1 including a product report system 10. In the embodiment, the functions of the product report system 10 are implemented by the computing device 1. The product report system 10 generates a measuring program that is used to display a panoramic drawing and the partial drawing of the product (e.g., a part of a mobile phone). In the embodiment, the measuring program can be written in a programming language, such as, for example, Java, C, or assembly. The measuring program is executable by the computing device 1. The measuring program is an application which is capable of automatically displaying the panoramic drawing and the partial drawing of other products (e.g., a part of a computer) of the same type. Additionally, the computing device 1 further comprises a plurality of peripherals that are connected to the computing device 1, such as a keyboard, and a mouse. The peripherals may be used to input or output various computing device signals or interfaces.

In one embodiment, the computing device 1 may be a computer, a server, a portable electronic device, or any other electronic device that includes a storage system 12, and at least one processor 14. In one embodiment, the storage system 12 may be a magnetic or an optical storage system, such as a hard disk drive (HDD), an optical drive, a compact disc, a digital video disc, a tape drive, a flash, a cache, a flash memory, an erasable programmable read only memory (EPROM), a flash memory, or other suitable storage medium. The processor 14 may be a central processing unit including a math co-processor, for example.

The computing device 1 is connected to a displaying device 2. The displaying device 2 is operable to display the measuring program. In one embodiment, the measuring program includes an operation interface for a user to start the measuring program.

Figure 2:
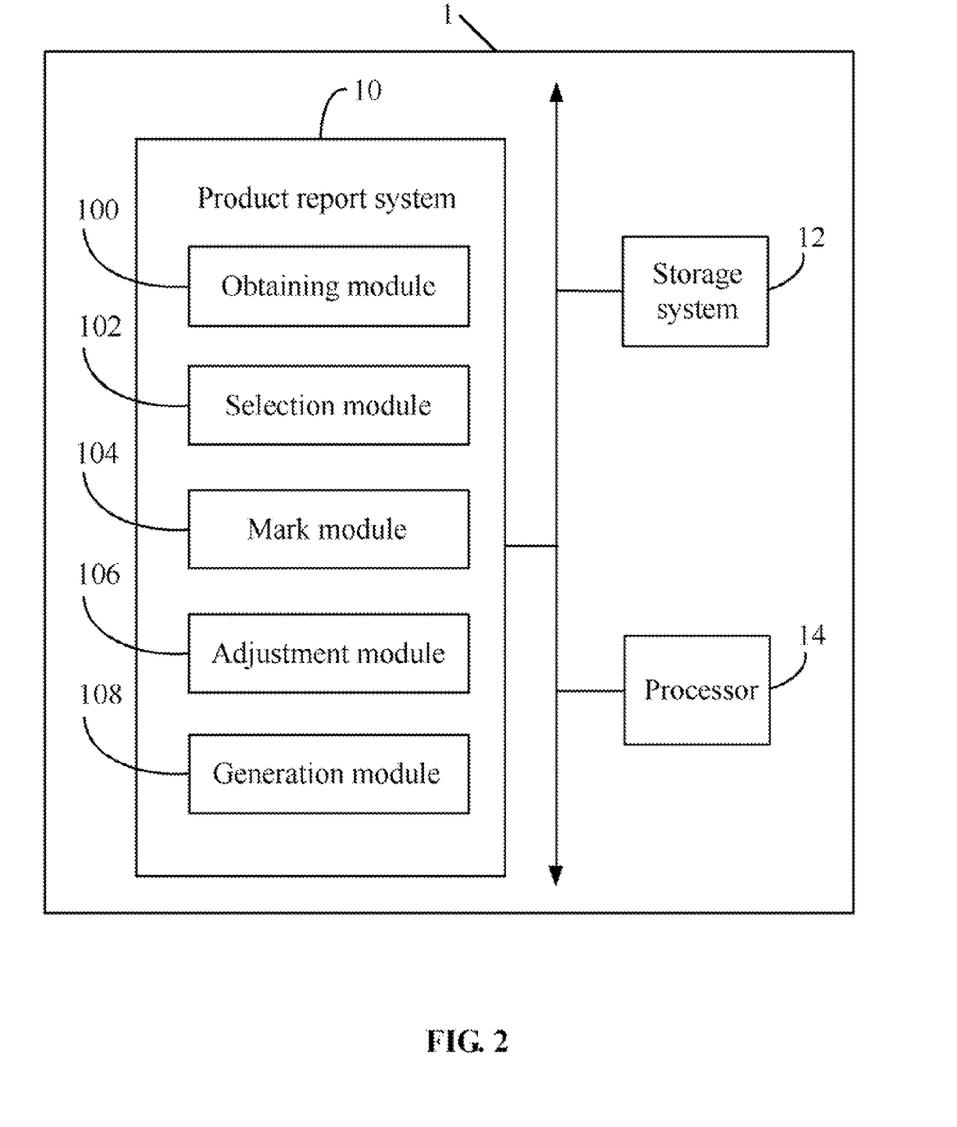
FIG. 2 is a block diagram of one embodiment of the product report system in FIG. 1.

FIG. 2 is a block diagram of one embodiment of the computing device 1 including a product report system 10. In one embodiment, the product report system 10 includes an obtaining module 100, a selection module 102, a mark module 104, an adjustment module 106, and a generation module 108. The modules 100-108 may include computerized code in the form of one or more programs that are stored in the storage system 12. The computerized code includes instructions that are executed by the at least one processor 14 to provide functions for modules 100-108.

Figure 4:
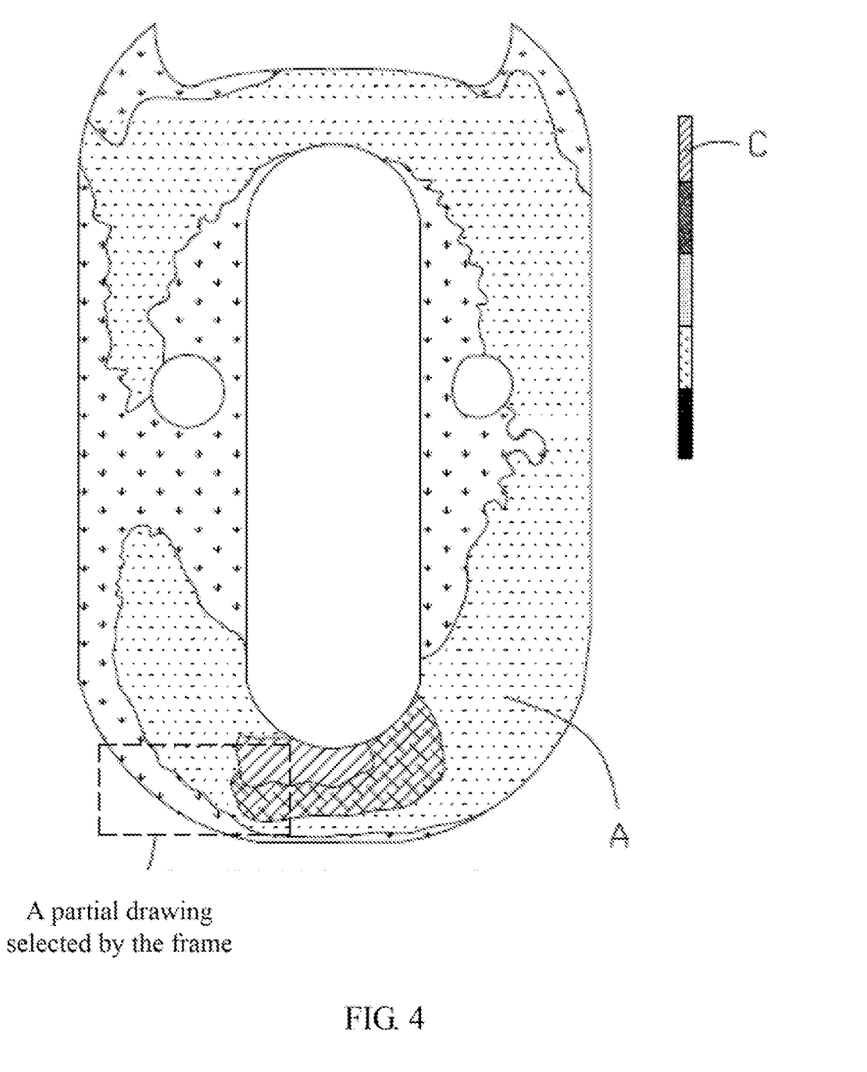
FIG. 4 illustrates one embodiment of a panoramic drawing of the product.

The obtaining module 100 obtains a panoramic drawing of a product from the storage system 12. The panoramic drawing of the product may be drawn by an image drawing application. The panoramic drawing of the product also may be generated by a scanner (e.g., laser scanner). For example, the laser scanner scans a surface of a physical product (e.g., a surface of a mobile phone) and generates the panoramic drawing of the surface of the physical product. The panoramic drawing of the product may be saved as a format (e.g., a drawing interchange format) into the storage system 12. The panoramic drawing further includes a color bar, and the color bar may include one or more colors. Each color shown in the color bar is defined for distinguishing each tolerance range. A plurality of tolerance ranges is defined for an area of a panoramic drawing of the product having a tolerance in a predetermined range. For example, blue-black is assigned to a first tolerance range [−0.14 mil, −0.12 mil], bright-yellow is assigned to a second tolerance range [+0.12 mil, +0.14 mil]. It is easier for a user to distinguish the tolerance ranges in the panoramic drawing by the color. For example, as shown in FIG. 4, the panoramic drawing A also includes the color bar C besides the panoramic drawing A. The color bar C includes four colors which are shown as shaded sections. The panoramic drawing A also includes four colors. The user can distinguish the tolerance ranges in the panoramic drawing A according to the colors of the color bar C.

Figure 5:
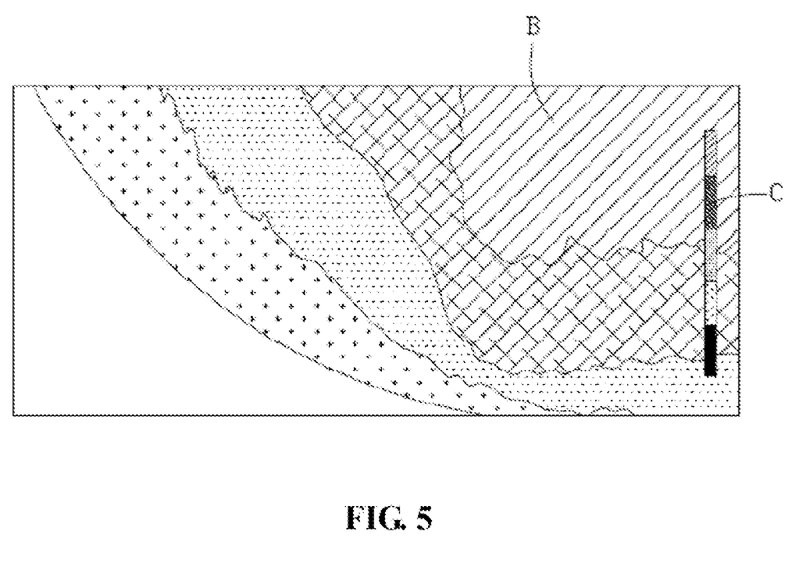
FIG. 5 illustrates one embodiment of a partial drawing of the product.

The selection module 102 selects a partial drawing from the panoramic drawing using a frame. In one embodiment, the partial drawing is a part of the panoramic drawing. The partial drawing also includes the color bar as shown in FIG. 5. The frame may be in a shape of, but is not limited to, a circle, a triangle, a rectangle, a square, a pentagon, a hexagon, a heptagon, an octagon, an enneagon, a decagon, a hendecagon, and a dodecagon, for example. In addition, the user can adjust the size of the frame, and the size of the partial drawing is indirectly adjusted.

The mark module 104 marks the frame in the panoramic drawing. In one embodiment, the mark module 104 highlights a rim of the frame in the panoramic drawing. For example, the mark module 104 changes the rim of the frame to be a broken line as shown in FIG. 4.

Figure 6:
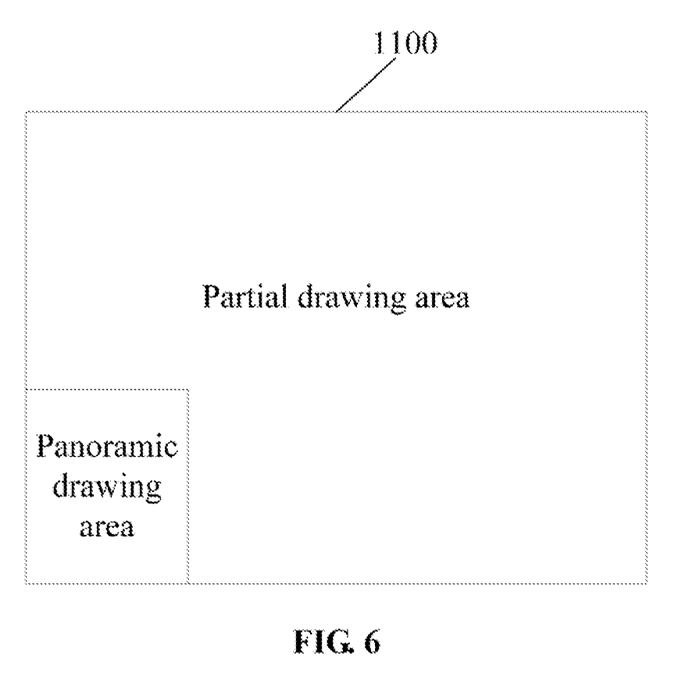
FIG. 6 illustrates one embodiment of a pattern of a report.
Figure 7:
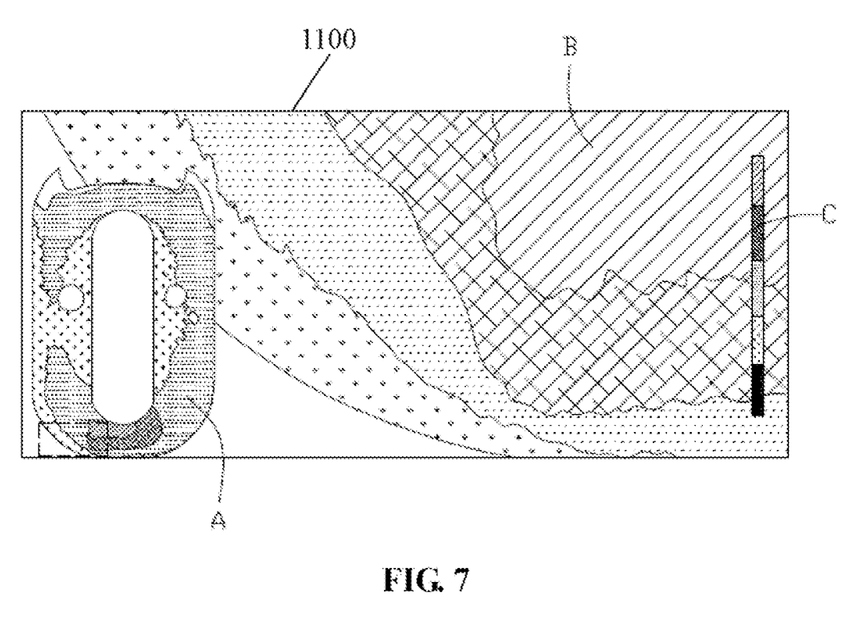
FIG. 7 illustrates one embodiment of the report that the panoramic drawing superposes on the partial drawing.

The selection module 102 sets a pattern of a report 1100 and shows the partial drawing and the panoramic drawing in the report 1100. In one embodiment, the pattern of the report 1100 is defined as a pattern that includes the partial drawing and the panoramic drawing. As shown in FIG. 6, the report 1100 includes a partial drawing area and a panoramic drawing area. The partial drawing area is used to show the partial drawing. The panoramic drawing area is used to shown the panoramic drawing. The panoramic drawing area is located in a lower left corner of the report 1100, and the left area of the report 1100 is the partial drawing area. The size of the report may be, but is not limited to, a size of an A4 sheet paper. As shown in FIG. 7, the report 1100 includes the partial drawing area and the panoramic drawing area.

The adjustment module 106 adjusts the size of the panoramic drawing and the size of the panoramic drawing in the report 1100. The panoramic drawing may superpose on the partial drawing in the report 1100 as shown in FIG. 7. The size of the panoramic drawing and the size of the panoramic drawing are adjusted until the panoramic drawing does not superpose on the partial drawing in the report 1100.

The generation module 108 generates a measuring program which includes programmed computerized code of the modules 100-106. The measuring program repeatedly executes from the module 100 to the module 106 in order when a user starts the measuring program. In one embodiment, when the user starts the measuring program, the measuring program obtains the panoramic drawing of the product from the storage system 12, selects the partial drawing from the panoramic drawing using the frame, marks the frame in the panoramic drawing, sets the pattern of the report 1100, and adjusts the size of the panoramic drawing and the size of the panoramic drawing in the report 1100. The measuring program includes functions of the modules 100-106. Additionally, the generation module 108 displays the measuring program on the displaying device 2, and stores the measuring program into the storage system 12.

Figure 3:
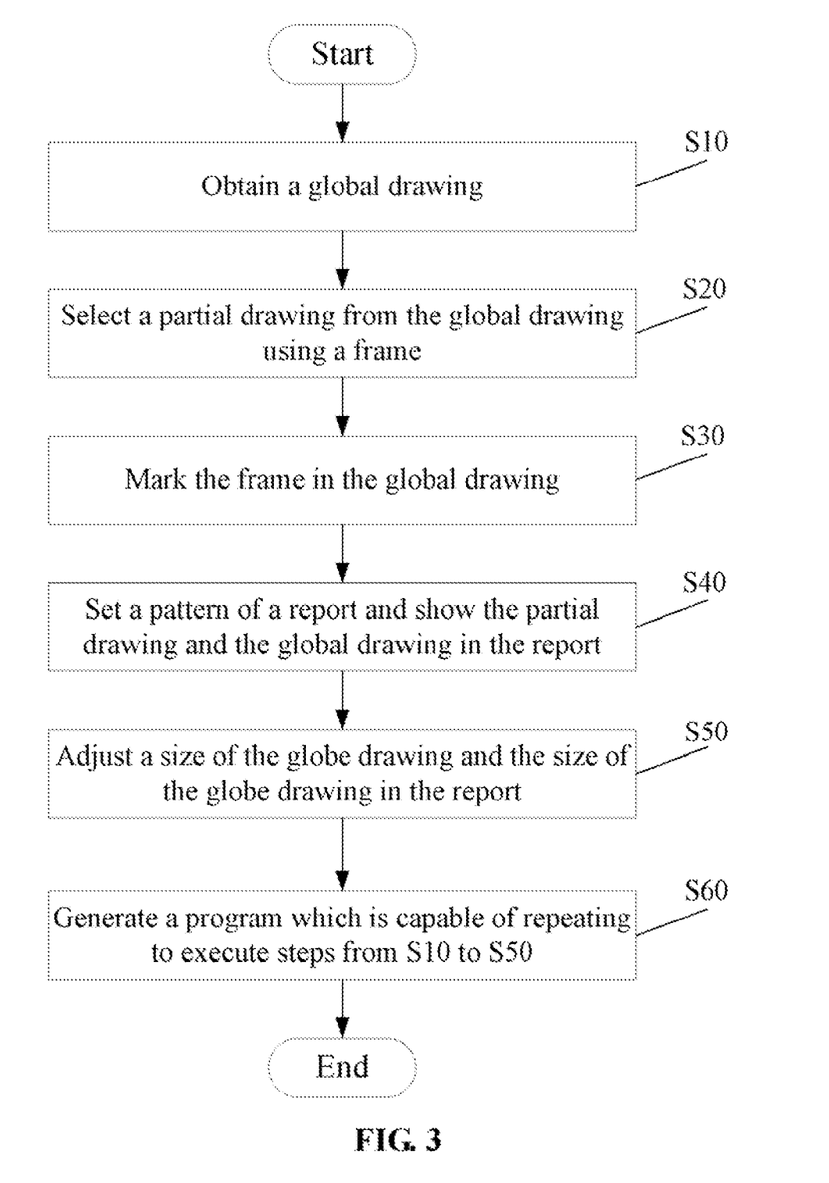
FIG. 3 is a flowchart illustrating one embodiment of a product report method.

FIG. 3 is a flowchart illustrating one embodiment of a product report method using the computing device 1 of FIG. 1. The method can be performed by the execution of a computer-readable program by the at least one processor 12. Depending on the embodiment, in FIG. 3, additional steps may be added, others removed, and the ordering of the blocks may be changed.

In step S10, the obtaining module 100 obtains a panoramic drawing of a product from the storage system 12. As mentioned above, the panoramic drawing further includes a color bar, and the color bar may include one or more colors. Each color shown in the color bar is defined for distinguishing each tolerance range. For example, as shown in FIG. 4, the panoramic drawing A also includes the color bar C besides the panoramic drawing A. The color bar C includes four colors. The panoramic drawing A also includes four colors. The user can distinguish the tolerance range in the panoramic drawing A according to the colors of the color bar C.

In step S20, the selection module 102 selects a partial drawing from the panoramic drawing using a frame. As mentioned above, the partial drawing also includes the color bar as shown in FIG. 5. The area surrounded by the frame in the panoramic drawing is equal to the size of the partial drawing. As shown in FIG. 4, the user may move a cursor of a mouse to a desired position of the panoramic drawing A, click at the desired position using the cursor of the mouse, and the frame is generated at the desired position. In addition, the user can adjust the size of the frame, and the size of the partial drawing is indirectly adjusted.

In step S30, the mark module 104 marks the frame in the panoramic drawing. For example, the mark module 104 changes the rim of the frame to be a broken line as shown in FIG. 4. Depending on the embodiment, the mark module 104 may change the rim of the frame to be a real line.

In step S40, the selection module 102 sets a pattern of a report 1100 and shows the partial drawing and the panoramic drawing in the report 1100. As mentioned above, the pattern of the report 1100 is defined as a pattern that includes the partial drawing and the panoramic drawing. In one embodiment, as shown in FIG. 6, the report 1100 includes a partial drawing area and a panoramic drawing area. The partial drawing is shown in the partial drawing area. The panoramic drawing is shown in the panoramic drawing area. As shown in FIG. 7, the report 1100 includes the partial drawing and the panoramic drawing.

Figure 8:
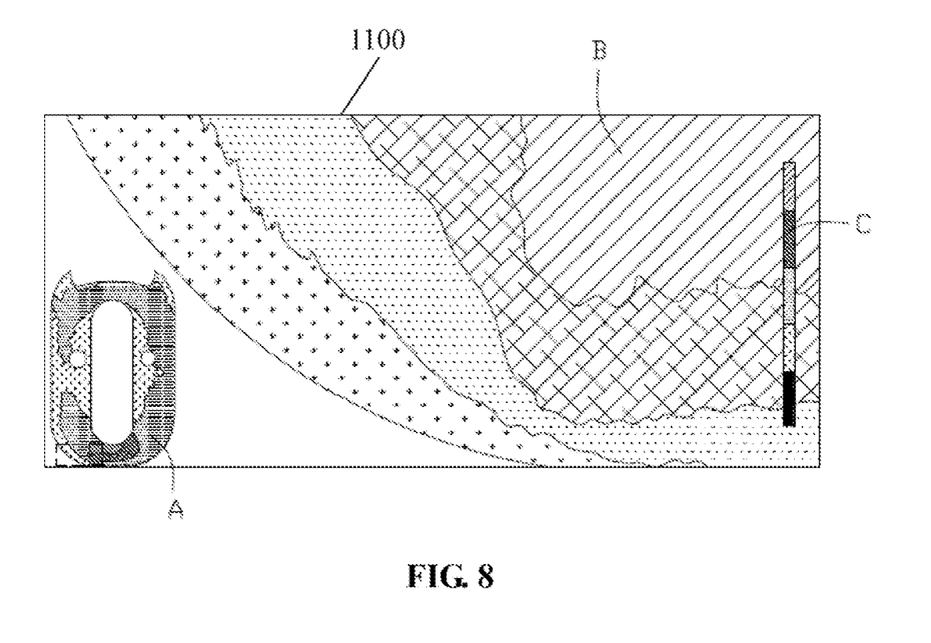
FIG. 8 illustrates one embodiment of the report that the panoramic drawing does not superposes on the partial drawing.

In step S50, the adjustment module 106 adjusts the size of the panoramic drawing and the size of the panoramic drawing in the report 1100. As mentioned above, the size of the panoramic drawing and the size of the panoramic drawing are adjusted until the panoramic drawing does not superpose on the partial drawing in the report 1100. The partial drawing is shown in the partial drawing area as big as possible. The panoramic drawing is shown in the partial drawing area as big as possible. In one embodiment, the adjustment module 106 may adjust the size of the partial drawing area and the size of the panoramic drawing area, the size of the partial drawing and the size of the panoramic drawing are adjusted accordingly. In order to display more details of the partial drawing, the size of the partial drawing area is adjusted to be four fifths of the report 1100, and the size of the panoramic drawing area is adjusted to be one fifth of the report 1100. After adjustment, the report is changed from FIG. 7 to FIG. 8. From the FIG. 8, the panoramic drawing A does not superposes on the partial drawing B.

In step S60, the generation module 108 generates a measuring program which is capable of repeating steps S10-S50 when a user starts the measuring program. The measuring program is generated by programming computerized code of the modules 110-106. Additionally, the generation module 108 displays the measuring program on the displaying device 2, and stores the measuring program into the storage system 12.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A computing device for generating a measuring program, comprising:
   at least one processor;
   a storage system; and
   one or more programs stored in the storage system and being executable by the at least one processor, the one or more programs comprising:

an obtaining module, wherein the obtaining module obtains a panoramic drawing of a product from the storage system, the panoramic drawing comprising a color bar which comprises one or more colors, and each color shown in the color bar being defined for distinguishing a tolerance range, and each tolerance range being defined for an area of the panoramic drawing of the product;

a selection module, wherein the selection module selects a partial drawing from the panoramic drawing using a frame, the partial drawing comprising the color bar;

a mark module, wherein the mark module marks the frame in the panoramic drawing;

the selection module, wherein the selection module further sets a pattern of a report and shows the partial drawing and the panoramic drawing in the report;

an adjustment module, wherein the adjustment module adjusts a size of the panoramic drawing and the size of the panoramic drawing in the report until the panoramic drawing does not superpose on the partial drawing in the report; and a generation module, wherein the generation module generates a measuring program which comprises programmed computerized code of the obtaining module, the selection module, the mark module, and the adjustment module.

2. The computing device as described in claim 1, wherein the measuring program repeatedly executes from the obtaining module, the selection module, the mark module, the adjustment module in order when a user starts the measuring program.

3. The computing device as described in claim 1, wherein the partial drawing is a part of the panoramic drawing.

4. The computing device as described in claim 1, wherein the mark module marks the frame in the panoramic drawing by highlighting a rim of the frame.

5. The computing device as described in claim 1, wherein the pattern of the report is a pattern that comprises the partial drawing and the panoramic drawing.

6. A computer-implemented method for generating a measuring program of a computing device, the method comprising:

(a) obtaining a panoramic drawing of a product from a storage system of the computing device, the panoramic drawing comprising a color bar which comprises one or more colors, and each color shown in the color bar being defined for distinguishing a tolerance range, and each tolerance range being defined for an area of the panoramic drawing of the product;

(b) selecting a partial drawing from the panoramic drawing using a frame, the partial drawing comprising the color bar;

(c) marking the frame in the panoramic drawing;

(d) setting a pattern of a report and showing the partial drawing and the panoramic drawing in the report;

(e) adjusting a size of the panoramic drawing and the size of the panoramic drawing in the report until the panoramic drawing does not superpose on the partial drawing in the report; and (f) generating a measuring program for repeating steps (a)-(e) when a user starts the measuring program.

7. The method as described in claim 6, wherein the partial drawing is a part of the panoramic drawing.

8. The method as described in claim 6, wherein the frame is marked in the panoramic drawing by highlighting a rim of the frame.

9. The method as described in claim 6, wherein the pattern of the report is a pattern that comprises the partial drawing and the panoramic drawing.

10. A non-transitory storage medium having stored thereon instructions that, when executed by a processor of a computing device, causes the computing device to perform a method of generating a measuring program, the method comprising:

(a) obtaining a panoramic drawing of a product from a storage system of the computing device, the panoramic drawing comprising a color bar which comprises one or more colors, and each color shown in the color bar being defined for distinguishing a tolerance range, and each tolerance range being defined for an area of the panoramic drawing of the product;

(b) selecting a partial drawing from the panoramic drawing using a frame, the partial drawing comprising the color bar;

(c) marking the frame in the panoramic drawing;

(d) setting a pattern of a report and showing the partial drawing and the panoramic drawing in the report; and (e) adjusting a size of the panoramic drawing and the size of the panoramic drawing in the report until the panoramic drawing does not superpose on the partial drawing in the report; and (f) generating a measuring program for repeating steps (a)-(e) when a user starts the measuring program.

11. The non-transitory storage medium as described in claim 10, wherein the partial drawing is a part of the panoramic drawing.

12. The non-transitory storage medium as described in claim 10, wherein the frame is marked in the panoramic drawing by highlighting a rim of the frame.

* * * * *